United States Patent
Steil et al.

(10) Patent No.: US 10,220,708 B2
(45) Date of Patent: Mar. 5, 2019

(54) BATTERY SYSTEM HAVING A BATTERY WHICH CAN BE CONNECTED BY AT LEAST ONE OF ITS HIGH-VOLTAGE TERMINALS VIA A CONTACTOR, AND METHOD FOR SWITCHING SUCH A CONTACTOR

(71) Applicant: Robert Bosch GmbH, Stuttgart (DE)

(72) Inventors: Michael Steil, Kortal-Muenchingen (DE); Gergely Galamb, Traunstein (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 15/110,468

(22) PCT Filed: Dec. 30, 2014

(86) PCT No.: PCT/EP2014/079452
§ 371 (c)(1),
(2) Date: Jul. 8, 2016

(87) PCT Pub. No.: WO2015/104206
PCT Pub. Date: Jul. 16, 2015

(65) Prior Publication Data
US 2016/0332522 A1  Nov. 17, 2016

(30) Foreign Application Priority Data
Jan. 10, 2014 (DE) .................... 10 2014 200 262

(51) Int. Cl.
*B60L 1/00* (2006.01)
*B60L 3/00* (2006.01)
(Continued)

(52) U.S. Cl.
CPC ............... *B60L 3/04* (2013.01); *B60L 3/0007* (2013.01); *H02J 1/08* (2013.01); *H02J 7/0031* (2013.01); *H02J 2001/008* (2013.01)

(58) Field of Classification Search
CPC .... B60L 3/04; B60L 3/0007; H02J 2001/008; H02J 1/08; H02J 7/0031
See application file for complete search history.

(56) References Cited

U.S. PATENT DOCUMENTS 5,796,175 A    8/1998  Itoh et al.
2005/0242775 A1*  11/2005  Miyazaki .............. B60L 11/185
                                                    320/116
(Continued)

FOREIGN PATENT DOCUMENTS

CN    2796078 Y    7/2006
CN    102007666 A    4/2011
(Continued)

OTHER PUBLICATIONS

International Search Report for Application No. PCT/EP2014/079452 dated Mar. 30, 2015 (English Translation, 2 pages).

*Primary Examiner* — Alfonso Perez Borroto
*Assistant Examiner* — Esayas G Yeshaw
(74) *Attorney, Agent, or Firm* — Michael Best & Friedrich LLP

(57) ABSTRACT

The present invention relates to a battery system having a battery which is designed to supply a high-voltage power system and can be connected by at least one of its high-voltage power system terminals via a contactor (10), which battery system comprises a control coil (20), and closes in one state in which a control current flows through the control coil, and opens in a further state in which no current flows through the control coil. In this context, in order to generate the control current, the control coil can be connected via a supply circuit (80) to a supply unit (50) by means of which (Continued)

a predetermined voltage can be made available which is lower than the voltage generated by the battery. In addition, the contactor or the supply circuit comprises an energy accumulator (90) which can be charged with a predetermined quantity of electrical energy by means of the supply unit which is connected to the control coil and makes available the predetermined voltage, and in the event of the predetermined voltage being lost, said contactor can continue to generate the control current flowing through the control coil for a first time by outputting the charged quantity of energy.

20 Claims, 3 Drawing Sheets

(51) Int. Cl.
  *H02G 3/00* (2006.01)
  *B60L 3/04* (2006.01)
  *H02J 1/08* (2006.01)
  *H02J 7/00* (2006.01)
  *H02J 1/00* (2006.01)

(56) References Cited

U.S. PATENT DOCUMENTS

| | | | | |
|---|---|---|---|---|
| 2009/0212627 A1* | 8/2009 | Sakata | ............... | H02H 9/001 307/10.7 |
| 2009/0308675 A1* | 12/2009 | Sato | ............... | B60L 11/123 180/65.285 |
| 2010/0127565 A1* | 5/2010 | Fukazu | ............... | B60K 1/00 307/9.1 |
| 2011/0264292 A1* | 10/2011 | Morishima | ............... | H02J 9/062 700/292 |
| 2011/0298576 A1* | 12/2011 | Baujan | ............... | H01H 71/122 337/5 |
| 2012/0217936 A1* | 8/2012 | Kung | ............... | H02M 3/156 320/163 |
| 2013/0175857 A1* | 7/2013 | Shreevani | ............... | B60L 3/0023 307/9.1 |
| 2014/0266052 A1* | 9/2014 | Klein | ............... | H02J 7/0042 320/127 |
| 2014/0285156 A1* | 9/2014 | Mukaitani | ............... | G01R 31/3624 320/134 |
| 2014/0300180 A1* | 10/2014 | Iwashita | ............... | B60L 3/00 307/10.1 |
| 2015/0165913 A1* | 6/2015 | Jacobsen | ............... | B60L 11/02 701/22 |
| 2017/0005371 A1* | 1/2017 | Chidester | ............... | H01M 10/425 |

FOREIGN PATENT DOCUMENTS

| | | |
|---|---|---|
| DE | 102008001145 A1 | 10/2009 |
| DE | 102009036672 A1 | 5/2010 |
| DE | 102012001861 A1 | 9/2012 |
| DE | 102011089817 A1 | 6/2013 |
| DE | 102012204788 A1 | 9/2013 |
| DE | 102012211393 A1 | 1/2014 |
| JP | 2010193691 A | 9/2010 |

* cited by examiner

BATTERY SYSTEM HAVING A BATTERY WHICH CAN BE CONNECTED BY AT LEAST ONE OF ITS HIGH-VOLTAGE TERMINALS VIA A CONTACTOR, AND METHOD FOR SWITCHING SUCH A CONTACTOR

BACKGROUND OF THE INVENTION

The present invention relates to a battery system having a battery which is designed to supply a high-voltage network and can be connected by at least one of its high-voltage network terminals via a contactor. The invention also relates to a method for switching a contactor for a battery which is designed to supply a high-voltage network and can be connected by one of its high-voltage network terminals via the contactor. The invention also relates to a vehicle having a battery system just mentioned.

Battery systems having batteries which can each supply a high-voltage network with a high voltage are used in vehicles (automobiles). Therefore, the battery cells or battery modules of such batteries are usually connected in series. Such batteries must then provide only small currents even in the case of high powers. In this case, the batteries are connected by their high-voltage terminals, that is to say the terminals via which the battery delivers the high voltage to the high-voltage network, via traction lines. Contactors are usually used in the traction lines both at the positive and at the negative high-voltage terminal of the battery. The contactors can be used to disconnect such a battery from the high-voltage network or from the remaining high-voltage system of the vehicle during parking or in a defective functional state (fault).

Such a contactor 10 is illustrated in FIGS. 1 to 3. In this case, the same reference symbols are used for the same components.

FIG. 1 illustrates a closed contactor 10 and FIG. 2 illustrates an open contactor 10. The contactor 10 is in the form of a magnetic switch 11 having a control coil 20. In this case, the magnetic switch 11 comprises a movable contact bridge 30 and two terminals 40. The contactor 10 closes in a state in which a control current flows through the control coil 20 and opens in a further state in which no current flows through the control coil 20.

If a control current flows through the control coil 20, the contact bridge 30 is moved toward the terminals 40 by means of magnetic force and is pressed against these terminals 40. If no current flows through the control coil 20, the contact bridge 30 immediately returns to its position at a distance from the terminals 40.

In order to generate the control current, the control coil 20 must be supplied with electrical energy. For this purpose, the contactor 10 can be connected to a supply unit (energy source) 50, for example via a control device 60 which is preferably a battery control device.

In this case, the supply unit 50 may be the low-voltage network (vehicle electrical system) of a vehicle which provides a voltage of 12 V. If the control coil 20 is connected to the supply unit 50 by means of the control device 60, the control current flows through the control coil 20 and the contactor 10 closes. If the connection between the control coil 20 and the energy source 50 is interrupted by the control device 60, no current flows through the control coil 20 and the contactor 10 opens.

Such contactors 10 used in the traction lines of a battery can disconnect currents of approximately 1 to 2 kA in a defective functional state. Fuses (fusible links) are usually used for higher currents.

As illustrated in FIG. 3, for currents of more than 3 to 10 kA, the result is a repulsion between the terminals 40 and the contact bridge 30 caused by the Lorentz force 70 occurring in a closed contactor 10. Currents of more than 3 to 10 kA may occur, for example, when there is a short circuit in the traction lines of the battery or when there is a short circuit in an inverter electrically coupled to the battery. This phenomenon is referred to as levitation. In this case, despite an active control coil 20 through which the control current flows, a small distance is produced between the terminals 40 and the contact bridge 30. Arcs 71 which fuse the contact surfaces of the terminals 40 are formed via this air gap. If the short-circuit current is then interrupted by the fuse connected to the corresponding high-voltage terminal, the contact bridge 30 presses the two fused terminals 40 together. In this case, the material solidifies and the contact bridge 30 can no longer be opened after switching off the control current flowing through the control coil 20. This fault is referred to as contactor adhesive. The two terminals 40 of the contactor 10 are connected to one another in a conductive manner and cannot be disconnected.

The time during which the contactor 10 must be able to carry the short-circuit current without suffering this effect is always longer than the time needed by the associated fuse (fusible link) to disconnect this short-circuit current in a contactor 10 with ideal dimensions. If a contactor 10 is dimensioned in this manner, the contactor 10 does not fuse on account of this effect, can still be switched after the short-circuit current has been disconnected by the tripped fuse and can disconnect the battery from the high-voltage network of the vehicle.

Such contactors 10 are usually opened and closed by the battery control device of a battery in which the contactors 10 are used. In this case, the battery control device can forward the low voltage of 12 V provided by the low-voltage network of a vehicle to the contactors 10.

If this low voltage of 12 V fails, the contactors 10 immediately open. There is the risk of the contactors 10 opening in an undesired manner even in the case of voltage fluctuations in the low-voltage network of the vehicle.

The document DE 199 47 105 C2 discloses a switching contactor having a magnetic drive and quick disconnection implemented using circuitry. As a result of the quick disconnection, the switching contactor can be permanently opened if there is a short-circuit current flowing through the switching contactor in order to be protected against contact fusing.

SUMMARY OF THE INVENTION

The invention provides a battery system having a battery which is designed to supply a high-voltage network and can be connected by at least one of its high-voltage network terminals via a contactor which comprises a control coil and closes in a state in which a control current flows through the control coil and opens in a further state in which no current flows through the control coil. In this case, the control coil can be connected to a supply unit via a supply circuit for the purpose of generating the control current, which supply unit can be used to provide a predetermined voltage which is smaller than the voltage generated by the battery. The contactor or the supply circuit also comprises an energy store which can be charged with a predetermined amount of electrical energy by means of the supply unit which is connected to the control coil and provides the predetermined voltage. In this case, if the predetermined voltage is lost, the energy store can continue to generate the control current flowing through the control coil for a first time by emitting the charged amount of energy.

The invention also provides a method for switching a contactor for a battery which is designed to supply a high-voltage network and can be connected by one of its high-voltage network terminals via the contactor, the contactor comprising a control coil and closing in a state in which a control current flows through the control coil and opening in a further state in which no current flows through the control coil. In this case, the control coil is connected to a supply unit via a supply circuit for the purpose of generating the control current, which supply unit is used to provide a predetermined voltage which is smaller than the voltage generated by the battery. Furthermore, an energy store arranged in the supply circuit or in the contactor is charged with a predetermined amount of electrical energy by means of the supply unit which is connected to the control coil and provides the predetermined voltage. If the predetermined voltage is lost, the control current flowing through the control coil continues to be generated for a first time by means of the energy store by emitting the charged amount of energy.

In the invention, the contactors used to disconnect a battery from its high-voltage terminals are still supplied with electrical energy, even if the predetermined voltage (also referred to as the supply voltage) is lost, by means of at least one energy store according to the invention. The battery can be connected to the high-voltage network of a vehicle, for example via its high-voltage terminals, and can supply it with electrical energy. In this case, if the supply voltage is lost, such a control current is generated during a first time using the energy store according to the invention that the corresponding contactors remain closed and do not open in an unwanted manner during the first time. This also means that, even if there are fluctuations (dips) in the predetermined voltage, the contactors are still supplied with sufficient electrical energy at least for the first time using the energy store according to the invention and do not open in an unwanted manner during the first time. This avoids the situation in which the contactors fuse and cannot open again at least during the first time on account of possible arcs. If the contactors open in an unwanted manner in a state in which they are conducting a current, arcs may be produced above a particular intensity of the current conducted by the contactors, in a similar manner to when levitation is present, which arcs result in the fusing of the contactors.

In one preferred embodiment of the battery system according to the invention, the high-voltage network terminal which can be connected to the battery via the contactor is also connected or can be connected to at least one fuse. In this case, the fuse is designed to conduct at least part of a current flowing through the closed contactor and to trip if there is a current flowing through the fuse which has a current intensity which exceeds a predetermined limit within a second time which is shorter than the first time.

If a contactor conducts such a strong current, for example a short-circuit current, that such arcs which result in the fusing of the contactor may occur when opening the contactor, the current conducted by the contactor is interrupted by the tripped fuse before the contactor opens as a result of supply voltage fluctuations or a supply voltage failure. The situation in which the contactor fuses on account of occurring arcs and can no longer open is therefore avoided.

The second time during which the fuse is tripped is preferably shorter than the time during which levitation can occur in a contactor which conducts an accordingly strong current, for example a short-circuit current.

In a further preferred embodiment of the battery system according to the invention, the control coil can be connected, via the supply circuit, to a low-voltage network which provides the predetermined voltage or supply voltage.

The control coil is preferably connected to the low-voltage network of a vehicle which provides a supply voltage of 12 V.

The energy store preferably comprises a capacitor or a further coil or a rechargeable battery cell. The capacitor or the further coil or the rechargeable battery cell is preferably connected or can be connected in parallel with the supply unit and/or the control coil. The further coil is further preferably connected or can be connected in series with the supply unit and/or the control coil.

Using an energy store, in particular a capacitance, for example a capacitor, between the terminals of the control coil of each contactor makes it possible to buffer both fluctuations (dips) in the supply voltage and failures of the supply voltage. As a result, the contactors can continue to be kept closed in these cases.

In the case of a vehicle having a battery system according to the invention with contactors, the control coils of which are supplied with electrical energy by means of the low-voltage network of the vehicle, the invention can be used to intercept fluctuations and failures of the supply voltage provided by the low-voltage network, which may occur, for example, as a result of an accident, on account of which the low-voltage network of the vehicle is partially or else completely damaged or switched off. (Such a low-voltage network of a vehicle provides a voltage of 12 V.) As a result of the fact that the contactors are reliably kept closed until at least one of the fuses (fusible links) of the battery system is tripped, for example if there is a short circuit in the high-voltage network of the vehicle caused by an accident, the contactors are prevented from opening in the event of an excessively high electrical load and the contactors are therefore prevented from fusing.

In one very advantageous embodiment of the battery system according to the invention, the supply circuit comprises a control device which is connected or can be connected to the supply unit and continues to provide the voltage provided by the supply unit in its state connected to the supply unit. For the purpose of switching the contactor, the control device arranged in the supply circuit is preferably designed to connect the control coil to the supply unit and to disconnect it from the supply unit. The control device arranged in the supply circuit is further preferably designed to adjust, in particular reduce, the control current flowing through the control coil.

The control device is preferably the battery control device.

Such contactors used in a battery system according to the invention are closed by a high operate voltage. The contactors are preferably opened and closed by the battery control device. In this case, the control coils of the contactors can be supplied with electrical energy by the battery control device. A voltage of 12 V from the low-voltage network of a vehicle is preferably passed to the contactors by the battery control device.

After the contactors have been closed, the control current flowing through the control coils of the contactors is preferably reduced by means of a pulse-width-modulated signal and/or by means of a reduced holding voltage and/or by using a so-called economizer coil. A contactor needs considerably less power in the closed state.

Another aspect of the invention relates to a vehicle having a battery system according to the invention.

An important advantage of the invention is the increase in the safety of a battery system (battery pack) according to the invention which is used in a vehicle and the contactors of which are supplied with electrical energy by means of the low-voltage network of the vehicle, since the process of ensuring the full functionality of such a battery system according to the invention no longer depends on the full functionality of the low-voltage network (12 V supply).

BRIEF DESCRIPTION OF THE DRAWINGS

Exemplary embodiments of the invention are described in detail below with reference to the accompanying drawings, in which.

DETAILED DESCRIPTION

Figure 1:
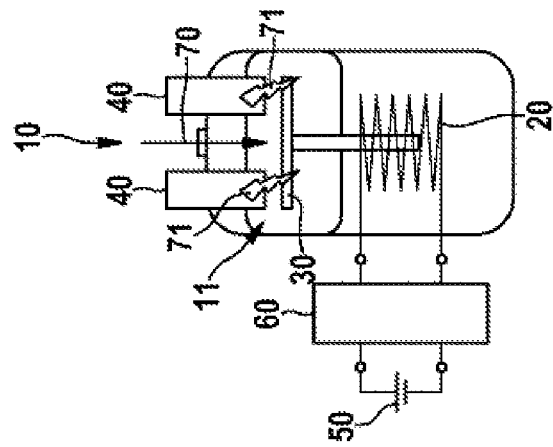
FIG. 1 shows a contactor known from the prior art in the closed state.
Figure 2:
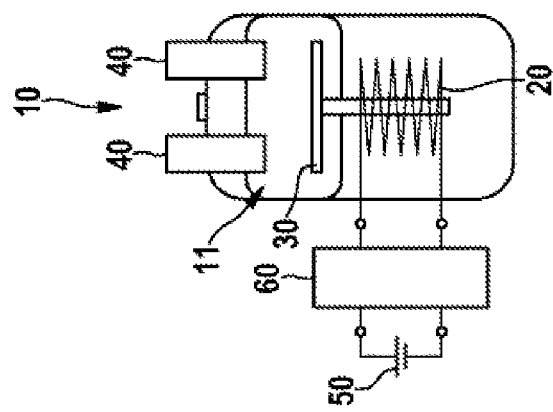
FIG. 2 shows the contactor illustrated in FIG. 1 in the open state.
Figure 3:
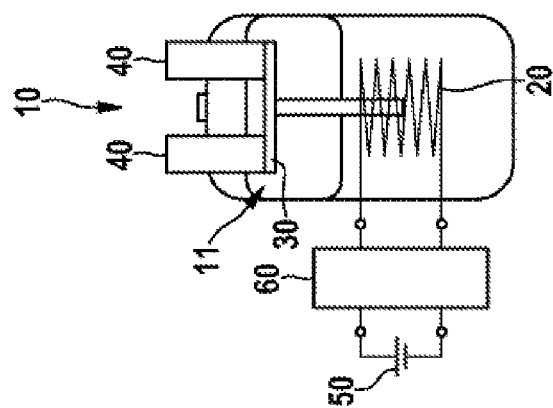
FIG. 3 shows the contactor illustrated in FIG. 1 when levitation is present.
Figure 4:
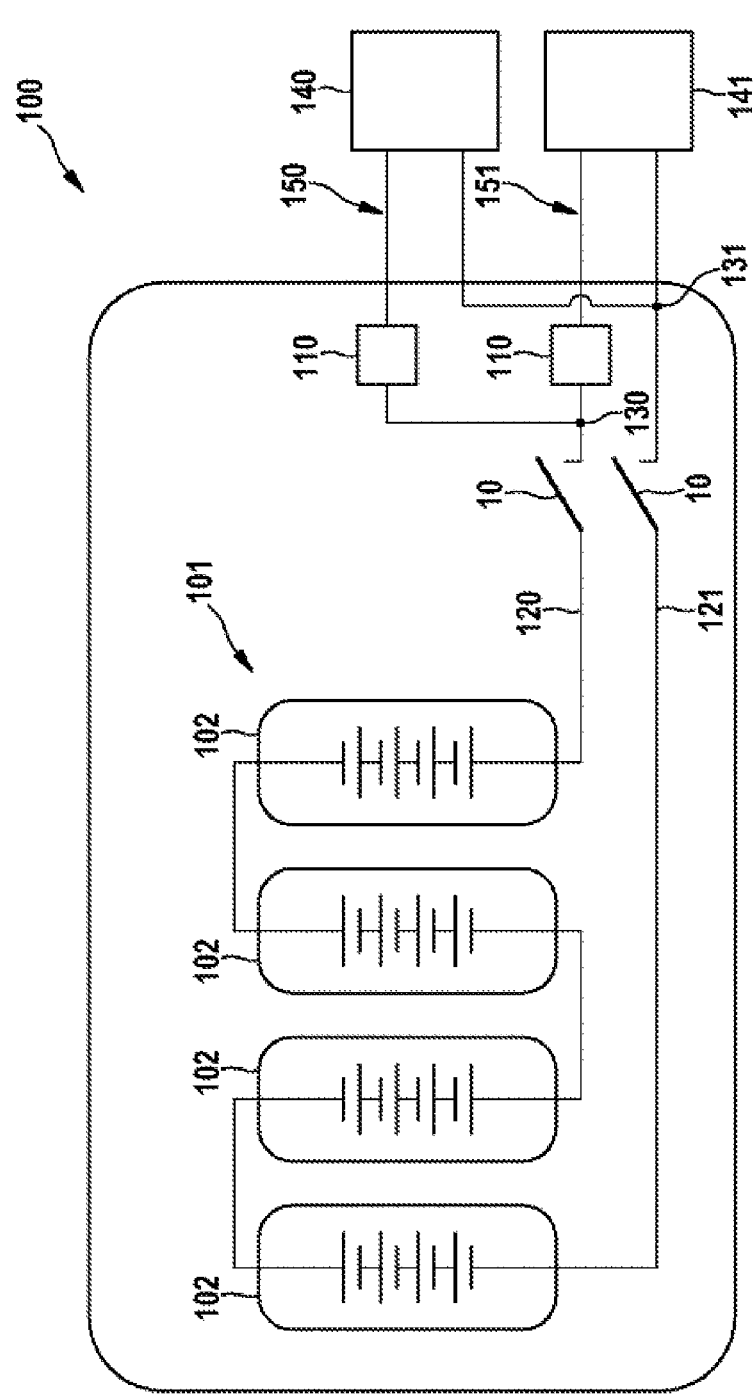
FIG. 4 shows a battery system according to the invention in accordance with a first embodiment of the invention, the battery system comprising a battery designed to supply a high-voltage network and at least one energy store for additionally supplying the contactors in the traction lines of the battery with electrical energy.

FIG. 4 illustrates a battery system 100 according to a first embodiment of the invention which comprises a battery 101 designed to supply a high-voltage network of a vehicle and at least one energy store (not illustrated) for supplying the contactors 10 in the traction lines 120, 121 of the battery 101 with electrical energy. The battery 101 comprises a plurality of battery modules 102 connected in series for the purpose of generating a battery voltage suitable for a high-voltage network. A contactor 10 is arranged in each of the traction lines 120, 121. The battery 101 can be connected by its positive high-voltage terminal 130 via one of the two contactors 10 and can be connected by its negative high-voltage terminal 131 via the other of the two contactors.

Two loads 140, 141 connected in parallel are connected between the high-voltage terminals 130, 131 of the battery 101. In this case, the positive high-voltage terminal 130 is connected to the load 140 via the load path 150 and is connected to the load 141 via the load path 151. The battery 101 of the battery system (battery pack) 100 does not have a fuse in the center. Each load path 150, 151 is individually protected via an associated fuse 110 of the battery system 100. Both fuses 110 are directly connected to the high-voltage terminal 130.

This above-mentioned architecture is used in battery systems in which the entire battery current is too large for an individual fuse (fusible link) in the center of the battery, that is to say there is no fuse on the market which can meet the requirements imposed on the battery current over the lifetime of the battery 101. A short circuit in one of the load paths 150, 151 trips the fuse 110 associated with it in the battery system 100. In order to switch the other load 150, 151 and the high-voltage network of the vehicle in a voltage-free manner, the two contactors 10 then open.

Figure 5:
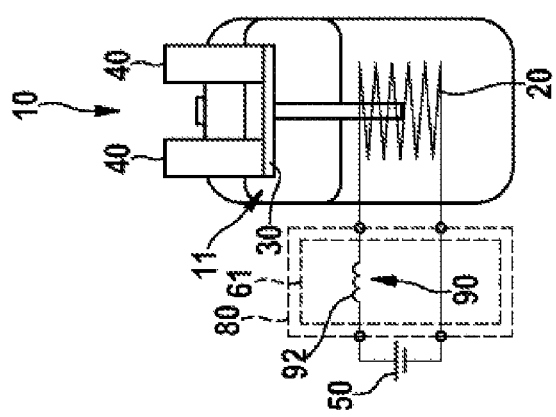
FIG. 5 shows a detailed illustration of a contactor which is used in the battery system according to the invention from FIG. 4 and has an associated energy store.

FIG. 5 illustrates, in detail, a contactor 10 for use in a battery system 100 according to the invention in accordance with the first embodiment of the invention.

The contactor 10 is in the form of a magnetic switch 11 having a control coil 20. The magnetic switch 11 comprises a movable contact bridge 30 and two terminals 40. The contactor 10 closes in a state in which a control current flows through the control coil 20 and opens in a further state in which no current flows through the control coil 20. If a control current flows through the control coil 20, the contact bridge 30 is moved toward the terminals 40 by means of magnetic force and is pressed against these terminals 40. If no current flows through the control coil 20, the contact bridge 30 immediately returns to its position at a distance from the terminals 40. FIG. 5 illustrates the contactor 10 in its closed state in which the contactor 10 can also conduct high currents, in particular short-circuit currents, which can flow through the traction lines 120, 121 of the battery, via the terminals 40 and the contact bridge 30.

In order to generate the control current, the control coil 20 can be connected to a supply unit 50 via a supply circuit 80, which supply unit provides a predetermined voltage which is smaller than the battery voltage generated by the battery 101. In this case, the supply unit 50 may be the low-voltage network (vehicle electrical system) of a vehicle which provides a voltage of 12 V.

In this case, the supply circuit (control line) 80 comprises a control device 61 and the cable harness for connecting the control coil 20 to the control device 61. The control device 61 is designed to connect the control coil 20 to the supply unit 50 for the purpose of closing the contactor 10 and to disconnect the control coil 20 from the supply unit 50 for the purpose of opening the contactor 10. The control device 61 is preferably designed to suitably adjust the current flowing through the control coil 20 for the purpose of switching the contactor 10. The control device 61 is further preferably the battery control device of the battery system 100.

The supply circuit 80 also comprises an energy store (energy stabilization unit) 90 which is arranged in the control device 61 in the illustration from FIG. 5. The energy store 90 can be installed on the printed circuit board of the control device 61 or in the cable harness for connecting the control coil 20 to the control device 61, that is to say in the cable harness situated between the control device 61 and the contactor 10. Alternatively, the energy store 90 can be installed in or on the contactor 10. In this case, the energy store 90 is provided for the purpose of being charged with a predetermined amount of electrical energy by means of the supply unit 50, which is connected to the control coil 20 and provides the predetermined voltage, and, if the predetermined voltage is lost, of continuing to generate the control current flowing through the control coil for a first time by emitting the charged amount of energy.

Figure 6:
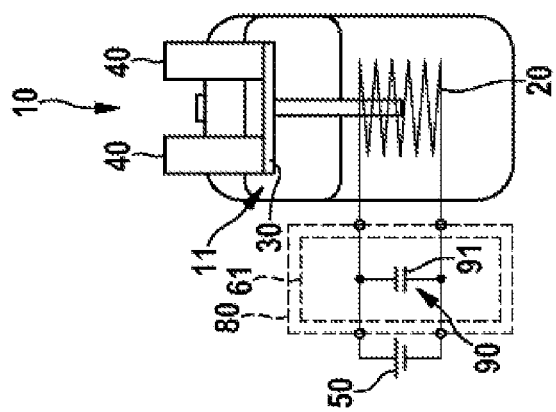
FIG. 6 shows a detailed illustration of a contactor which is used in the battery system according to the invention from FIG. 4 and has an associated energy store which comprises a capacitor.

As illustrated in FIG. 6, the energy store 90 preferably comprises at least one capacitor 91, for example an electrolytic capacitor, which is electrically connected or can be electrically connected in parallel with the supply unit 50 and/or the control coil 20.

If the voltage supply for the contactor 10, which is achieved by means of the supply unit 50, fails or is temporarily interrupted, the electrical energy stored in the energy store 90 or in the capacitor 91 of the energy store 90 ensures that the contactor 10 still remains closed because its control coil 20 is still supplied with electrical energy.

Figure 7:
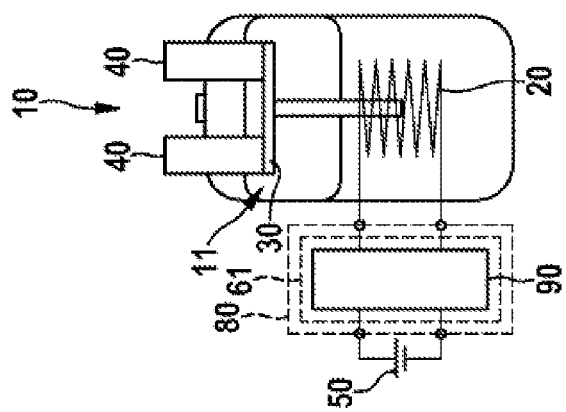
FIG. 7 shows a detailed illustration of a contactor which is used in the battery system according to the invention from FIG. 4 and has an associated energy store which comprises a further coil.

As illustrated in FIG. 7, instead of the capacitor 91, the energy store 90 preferably comprises a further coil 92 with an appropriate inductance which is connected or can be connected in series with the supply unit 50 and/or the control coil 20 and, if the supply voltage of 12 V, for example, provided by means of the supply unit 50 fails, continues to maintain the flow of the control current flowing through the control coil 20. Alternatively, the further coil 92 of the energy store 90 can be connected or connectable in parallel with the supply unit 50 and/or the control coil (excitation coil) 20.

Instead of the capacitor 91, the energy store 90 may further preferably comprise a rechargeable battery cell (rechargeable cell) which is electrically connected or can be electrically connected in parallel with the supply unit 50 and/or the control coil 20. The rechargeable battery cell is preferably introduced into the supply path of the contactor 10 in parallel with the supply unit 50, for example on the printed circuit board of the control device 61 or of the battery control device of the battery system 100. If the supply voltage of 12 V, for example, provided by the supply unit 50 fails, this rechargeable battery cell continues to maintain the voltage supply for the control coil 20.

A vehicle which is operated using a battery system 100 according to the invention can be subjected to a crash test which may result in the production of arcs and fusing of the contactors 10.

During an accident involving a vehicle, an apparatus of the vehicle disconnects the low-voltage network of the vehicle. Relevant lines of the low-voltage network may also be torn as a result of an accident. However, in the event of an accident, the high-voltage network of the vehicle still operates. The accident results in a low-resistance short circuit being produced in this high-voltage network. If the vehicle is operated using a battery system 100 according to the invention, the energy stores 90 in the form of capacitors 92, for example, on the two contactors 10 of the battery 101 ensure that the contactors 10 are opened only after the high-voltage network has been disconnected by at least one tripped fuse (fusible link) 110 even though the low-voltage network has already collapsed before the high-voltage network is disconnected by the tripped fuse 110. This results in the contactors 10 opening properly after the high-voltage network has been disconnected by at least one of the fusible links 110, that is to say at a time in which current no longer flows via them. Consequently, the contactors 10 do not adhere and the high-voltage network of the vehicle is voltage-free because the battery 101 has been disconnected therefrom. Rescue teams can now rescue the possibly injured occupants without the risk of an electric shock.

In addition to the written disclosure above, reference is hereby additionally made to the illustration in FIGS. 1 to 7 for the further disclosure of the invention.

The invention claimed is:

1. A battery system (100) having a battery (101) which is configured to supply a high-voltage network and is connected by at least one of its high-voltage network terminals (130, 131) via a contactor (10) which includes a control coil (20) and closes in a state in which a control current flows through the control coil (20) and opens in a further state in which no current flows through the control coil (20), and the control coil (20) is connected to a supply unit (50) via a supply circuit (80) for the purpose of generating the control current, which supply unit is used to provide a predetermined voltage which is smaller than the voltage generated by the battery (101), wherein the contactor (10) or the supply circuit (80) comprises an energy store (90) which is charged with a predetermined amount of electrical energy by the supply unit (50), which is connected to the control coil (20) and provides the predetermined voltage, and, if the predetermined voltage is lost, continues to generate the control current flowing through the control coil (20) for a first time period by emitting the charged amount of energy.

2. The battery system (100) as claimed in claim 1, the contactor (10) also being connected or configured to be connected to at least one fuse (110) configured to conduct at least part of a current flowing through the closed contactor (10) and to trip if there is a current flowing through the fuse (110) with a current intensity which exceeds a predetermined limit within a second time period which is shorter than the first time period.

3. The battery system (100) as claimed in claim 1, the control coil (20) configured to be connected, via the supply circuit (80), to a low-voltage network which provides the predetermined voltage.

4. The battery system (100) as claimed in claim 1, the energy store (80) including a further element connected or configured to be connected in parallel with the supply unit (50) and/or the control coil (20).

5. The battery system (100) as claimed in claim 1, the supply circuit (80) comprising a control device (61) connected or configured to be connected to the supply unit (50) and the control device (61) continuing to provide the voltage provided by the supply unit (50) in the state of being connected to the supply unit and/or, for the purpose of switching the contactor (10), is configured to connect the control coil (20) to the supply unit (50) and to disconnect it from the supply unit (50) and/or to adjust, the control current flowing through the control coil (20).

6. A method for switching a contactor (10) for a battery (101) configured to supply a high-voltage network and connect by one of its high-voltage network terminals (130, 131) via the contactor (10), the contactor (10) comprising a control coil (20) and closing in a state in which a control current flows through the control coil (20) and opening in a further state in which no current flows through the control coil (20), and the control coil (20) connected to a supply unit (50) via a supply circuit (80) for the purpose of generating the control current, which supply unit is used to provide a predetermined voltage which is smaller than the voltage generated by the battery, wherein an energy store arranged in the supply circuit (80) or in the contactor (10) is charged with a predetermined amount of electrical energy by the supply unit (50), which is connected to the control coil (20) and provides the predetermined voltage, and, if the predetermined voltage is lost, the control current flowing through the control coil (20) continues to be generated for a first time period by the energy store (80) by emitting the charged amount of energy.

7. The method as claimed in claim 6, the contactor (10) also being connected to at least one fuse (110) for conducting at least part of a current flowing through the closed contactor (10), the fuse (110) being tripped if there is a current flowing through the fuse with a current intensity which exceeds a predetermined limit within a second time period which is shorter than the first time period.

8. The method as claimed in claim 6, the control coil (20) being connected, via the supply circuit (80), to a low-voltage network which is used to provide the predetermined voltage.

9. The method as claimed in claim 6, the energy store (80) comprising a capacitor (91) or a further coil (92) or a rechargeable battery cell, the capacitor (91) or the further coil (92) or the rechargeable battery cell being connected in parallel with the supply unit (50) and/or the control coil (20), or the further coil being connected in series with the supply unit (50) and/or the control coil (20).

10. The method as claimed in claim 6, the predetermined voltage being provided by a control device (61) arranged in the supply circuit (80) and connected to the supply unit (50), and/or the contactor (10) being switched by the control device (61) arranged in the supply circuit (80) by virtue of the control coil (20) being connected to the supply unit (50) or being disconnected from the supply unit (50) by the control device (61) and/or the control current flowing through the control coil (20) being adjusted.

11. A vehicle having a battery system (100) as claimed in claim 1.

12. The battery system (100) as claimed in claim 4, wherein the further element is a capacitor (91).

13. The battery system (100) as claimed in claim 4, wherein the further element is a coil (92).

14. The battery system (100) as claimed in claim 4, wherein the further element is a rechargeable battery cell.

15. The battery system (100) as claimed in claim 1, the energy store (80) including a further element connected or configured to be connected in series with the supply unit (50) and/or the control coil (20).

16. The battery system (100) as claimed in claim 15, wherein the further element is a capacitor (91).

17. The battery system (100) as claimed in claim 15, wherein the further element is a coil (92).

18. The battery system (100) as claimed in claim 15, wherein the further element is a rechargeable battery cell.

19. The battery system (100) as claimed in claim 5, wherein the adjustment of the control current flowing through the control coil (20) is a reduction of the control current.

20. The method as claimed in claim 10, wherein the control current flowing through the control coil (20) is reduced, by the control device (61) arranged in the supply circuit (80).

* * * * *